United States Patent Office 3,536,784
Patented Oct. 27, 1970

3,536,784
PROCESS FOR PREPARING ABS POLYMERS
Steve G. Skendrovich, Cheswick, and Jack N. Bauer, Pittsburgh, Pa., assignors to Koppers Company, Inc., a corporation of Delaware
No Drawing. Filed Nov. 4, 1968, Ser. No. 773,281
Int. Cl. C08f 29/12, 29/56
U.S. Cl. 260—876   5 Claims

ABSTRACT OF THE DISCLOSURE

A process is provided for preparing ABS polymers having high gloss, flow, and impact properties by suspension polymerizing 15–20% by weight of a solution of elastomers consisting of (a) 25–75% polybutadiene rubber and (b) 75–25% styrene-butadiene block copolymer of specific styrene content; in a mixture of 50–65% styrene and 20–30% acrylonitrile monomers by a two-stage polymerization sequence.

BACKGROUND OF THE INVENTION

It is known to produce impact polymers of acrylonitrile, butadiene polymer, and styrene by dissolving the butadiene polymer and the acrylonitrile monomer in styrene monomer to form a solution thereof and then dispersing this solution in an aqueous suspension system and polymerizing to form a bead multi-polymer. Such multi-polymers tend to have surface blemishes or "windows," probably due to the presence of butadiene polymer as discrete units or gels in the multi-polymer. When pigments or colorants are added to the multi-polymer, these windows prevent an even dispersion of the same and result in a spotted or blemished product. In addition, such multi-polymers suffer from low gloss and poor flow properties.

It has been found that, if the butadiene polymer portion of such multi-polymer is replaced, in part, by a block copolymer elastomer of butadiene and styrene, a multi-polymer can be produced, in bead suspension systems, that does not have blemishes in the polymer and that has high gloss and flow properties.

SUMMARY OF THE INVENTION

High impact acrylonitrile-polybutadiene-styrene bead polymers having high gloss values, and melt index values and melt index values in excess of 1.0, are prepared by a process using a novel double-rubber composition. The novel impact polymers are produced by polymerizing, in aqueous suspension, 15–20% by weight of a solution of elastomers consisting of polybutadiene rubber and a butadiene-styrene block copolymer containing 73–77% butadiene and 27–23% styrene, in a mixture of 50–65% by weight of styrene and 20–30% by weight of acrylonitrile, at temperatures of 70–80° C., for a period of 7–11 hours and 115–125° C. for a period of 4–8 hours.

DETAILED DESCRIPTION

The high impact multi-polymers contain from 15–20% by weight of the polybutadiene and polybutadiene-styrene copolymer elastomers; 50–65% by weight of styrene and 20–30% by weight of acrylonitrile. The elastomer portion comprises 25–75% by weight of polybutadiene and 75–25% of a block copolymer consisting essentially of 73–77% by weight butadiene and 27–23% by weight of styrene. The use of less than about 25% of block copolymer causes a damaging reduction in flow properties in the multi-polymer while the use of more than about 75% significantly reduces the impact properties of the resultant multi-polymer.

The block copolymer that comprises 75–25% by weight of the elastomer portion of the high impact multi-polymer is a copolymer having 73–77% by weight butadiene and 27–23% by weight styrene and can be schematically illustrated as —BBBBBBBBBB—SSS— where B signifies a butadiene unit and S signifies a styrene unit. If the block copolymer contains greater than about 77% butadiene, the multi-polymer produced will suffer from poor flow properties while the use of block copolymers having less than about 73% butadiene does not give the desired impact properties. The remainder of the elastomer portion of the high impact multi-polymer comprises a conventional polybutadiene polymer, including various steriospecific-type butadiene polymers.

The styrene and acrylonitrile content of the multi-polymer is important, with 50–65% by weight of the multi-polymer being styrene and 20–30% by weight being acrylonitrile. If the styrene and acrylonitrile contents are outside these prescribed ranges, the multi-polymer will not have the high impact, gloss, and flow properties that result from following the process of the present invention. For example, keeping the elastomer portion constant and increasing the styrene portion will cause brittleness in the multi-polymer and reduction in solvent resistance properties. If the acrylonitrile content is held constant and the styrene portion increased, there results a multi-polymer having reduced impact properties. On the other hand, if the elastomer portion is kept constant and the styrene portion decreased, a hard polymer is produced and solubility of the elastomer in the monomer mixture is difficult. Keeping the acrylonitrile content constant and increasing the elastomer portion will also cause problems of solubility of the elastomer in the monomer solution.

The process of the present invention comprises first dissolving the elastomer portion of the multi-polymer in a solution formed by the styrene and acrylonitrile to be used. The elastomers are fed to the styrene-acrylonitrile solution and the mixture stirred and heated to a moderate temperature; about 50° C., with stirring. After about a 3–5 hour period, the elastomers are completely dissolved in the acrylonitrile and styrene to form a viscous solution.

Following the dissolving of the elastomers in the styrene-acrylonitrile solution, the desired catalysts and modifiers are added to the solution. Useful catalysts include the free radical initiating catalysts, such as organic peroxides, including benzoyl peroxide, t-butyl perbenzoate, lauroyl peroxide and other free radical producing catalysts such as azobisisobutyronitrile. The catalysts are generally present in about 0.5–2.5% by weight of the combined monomer and elastomer content. In the present process, a dual catalyst system is preferably used, with about 0.5–2% of a low temperature initiator (ca. 70–80° C.) such as lauroyl peroxide being used and about 0.01–0.5% of a high temperature initiator (ca. 115–125° C.) such as t-butyl perbenzoate being used.

Also to the solution of elastomers styrene and acrylonitrile, there may be added an antioxidant. The presence of an antioxidant in the recipe will produce a non-discolored product. Especially useful are the phenolic type antioxidants such as 2,6-ditertiarybutyl-4-methyl phenol or other alkylated phenolic types such as the liquid alkylated phenolic type antioxidant sold by Neville Chemical Company under the trademark Nevastain AR. Generally, about 0.25–2.5% by weight, of the combined monomer-mixture, of antioxidant is used.

Suitable chain transfer agents may be added to the polymerization mixture for molecular weight control. Useful chain transfer agents include normal or tertiary alkyl mercaptans having from 4–16 carbon atoms such as t-dodecylmercaptan and n-dodecylmercaptan. Other useful agents include the lower alkyl xanthogens, such as diisopropyl xanthogen; alpha-bromoethylbenzene; alpha-chloroethylbenzene; carbon tetrabromide, α-methylstyrene dimer and the like. Such modifiers are generally added in about 0.4–1.5% of the combined monomer-elastomer mixture.

The monomer-elastomer solution is polymerized under an inert atmosphere of nitrogen or other inert gas, in aqueous suspension to give a bead multi-polymer. Suitable suspension systems comprise those aqueous systems containing inorganic suspending agents such as described in D'Alelio patent, U.S. 2,983,692, in combination with an anionic surface active agent, and organic suspending agents described in Buchholtz et al., U.S. 2,950,261.

The time-temperature relationship needed to produce the high gloss, high impact multi-polymer of the present invention comprises a two-stage polymerization sequence. The aqueous suspension of elastomer-monomers solution in water is heated to a temperature of 70–80° C. for about 7–11 hours. Shorter times give insufficient conversion, while longer times are ineffective because of the expiration of the catalyst. Preferably, the polymerization mixture is heated at 70–80° C. until at least about 80% conversion of the monomers has occurred and the temperature then raised for completion of the polymerization. Following the lower temperature heating period, the temperature is arised to 115–125° C. and the polymerization continued for 4–8 hours. This enables substantially complete conversion of the monomers.

Following the polymerization sequence, the reaction mixture is removed from the reactor, residual monomers stripped, preferably by steam distillation and cooled. The mixture is acidified, and the multi-polymer beads removed from the aqueous suspension by centrifuge or the like and dried. The polymer beads may then be extruded into pellet form by conventional means, additives or further stabilizers being preferably added during the blending and extrusion step.

The multi-poylmers produced according to the present invention have excellent impact and flow characteristics. The impact properties were determined by Izod Impact testing which shows the resistance of the material to a shock loading. The test, according to ASTM D–256 involves the notching of specimens which are placed in the jaws of a machine and struck with a weighted pendulum. The flow properties were measured as melt index values, that is the amount of the material which can be forced through a 0.0825 inch orifice when subjected to 2160 grams force in 10 minutes at 190° C., generally according to ASTM D–1238–65T. Other physical properties were also determined by ASTM procedures such as tensile strength, D–638–64T; modules, D–638; tensile yield, D–638; yield elongation and elongation at break, D–638, and heat distortion temperature, D–648.

The invention is further illustrated by the following examples.

EXAMPLE I

To a reactor, having a 3-bladed impeller, there is added 100 parts of water having therein as suspending agents 2.0 parts of tricalcium phosphate and 1.0 part of sodium beta-tetrahydronaphthalene sulfonate. To the agitated aqueous media, there was added a monomer mixture comprising 55 parts of styrene and 25 parts acrylonitrile, the mixture having dissolved therein, 10 parts of polybutadiene rubber and 10 parts of a 75/25 block copolymer of butadiene and styrene (Solprene 1205). The monomer solution contained, as catalyst, 0.5 part of lauroyl peroxide and 0.1 part of t-butylperbenzoate; as a molecular weight modifier, 0.5 part alphamethylstyrene dimer and 0.25 part n-dodecylmercaptan; and as stabilizer, 0.5 part of an antioxidant, Nevastain A, a liquid alkylated phenol antioxidant having a specific gravity of 1.08–1.09 at 30°/15.6° C. and a viscosity S.S.U. at 210° F. of 50–60. The reactor was purged with nitrogen and heated to 70° C with stirring. The polymerization was carried out by heating the agitated suspension for 3 hours at 70° C., 5 hours at 80° C., and 4 hours at 115° C. After steam stripping, the suspension produced was cooled to room temperature and the polymer beads separated from the aqueous phase by centrifuge, washed with water, and air dried. The beads were analyzed for residual monomers and contained 1.2% styrene and 1.1% acrylonitrile. The acrylonitrile-polybutadiene-styrene beads were processed in a 5 lb. Banbury with addition of 0.5 part butylated hydroxytoluene, a stabilizer, and the beads were mixed for three minutes after make up. Calcium stearate, 0.5 part was charged in and mixing continued for 2 additional minutes. The resulting product was passed through a Cumberland mill and pelletized in a 1″ NRN extruder. The resulting impact polymer had no gels or surface blemishes due to occluded polybutadiene and the following physical properties:

Molding temperature—440° F.
Tensile strength, p.s.i—4,723
Modulus, p.s.i.×$10^5$—2.80
Tensile yield p.s.i.—5.344
Yield elongation, percent—2.7
Elongation at break, percent—11
Heat distortion temperature—194° F.
Impact strength, notched Izod—5.6 ft./lbs. per inch
Gardner falling weight—>120 in./lbs.
Melt index—1.5 g./10 min.

EXAMPLE II

A series of experiments were carried out to show the effect of the use of 25–75% by weight of a styrene-butadiene block copolymer as a portion of the elastomer content of the multi-polymers on the gloss properties of the multi-polymers of the present invention. The polymerizations were carried out using the general procedure of Example I. In one experiment (A), 10% polybutadiene and 10% styrene-butadiene block copolymer were used as elastomer; a second experiment (B) used 7% polybutadiene and 13% styrene-butadiene block copolymer; and a third experiment (C) used no styrene-butadiene block copolymer, but 15% polybutadiene as elastomer. The effect of the styrene-butadiene block copolymer on the gloss values of the multi-polymers produced were as follows:

TABLE I

| Experiment | Polybutadiene wt. percent | S–B Block copolymer wt. percent | Gloss reading 20° |
|---|---|---|---|
| A | 10 | 10 | 34 |
| B | 7 | 13 | 32 |
| C | 15 | 0 | 9 |

The gloss measurements were made on a Gardner automatic photometric unit using two-inch, injection molded discs as test specimens. Four measurements were made at four different positions on one side of the disc, the average of the four measurements, taken at a 20° angle being the recorded value. The higher the value, the better is the gloss. As can be seen from the above data, the product of the present invention has significantly increased gloss values over a butadiene multi-polymer containing no styrene-butadiene block copolymer. In addition, to the low gloss values of the multi-polymers containing no block copolymer elastomer, (C), the multi-polymers had gels or areas of occluded polybutadiene evident in the multi-polymer.

EXAMPLE III

The process of Example I was repeated except that no polybutadiene elastomer was used and 20% by weight of the styrene-butadiene block copolymer was used as the only elastomer. The product had an unacceptable impact strength of only 1.2 ft. lbs./in. by notched Izod, and a Gardner falling weight value of only 64 in./lbs. Thus, the substitution of block copolymer for all of the elastomer does not give suitable impact properties.

What is claimed is:

1. A process for the preparation of a high impact acrylonitrile-butadiene-styrene bead multi-polymer having an Izod value of greater than 5.0, high gloss, and a melt index of greater than 1.0, comprising:
   (a) heating in aqueous stabilized suspension a free radical catalyzed polymerization mixture comprising:
      (1) 15–20% by weight of a solution of elastomers consisting of:
         (a) 25–75% by weight of a polybutadiene rubber and
         (b) 75–25% by weight of a block copolymer consisting essentially of 73–77% by weight butadiene and 27–23% by weight of styrene; in
      (2) a mixture of 50–65% by weight of styrene and 20–30% by weight of acrylonitrile for a period of 7–11 hours at a temperature of 70–80° C., followed by a period of 4–8 hours at 115–125° C., to substantially complete polymerization;
   (b) separating any residual monomers from said polymerization mixture;
   (c) acidifying said polymerization mixture; and
   (d) separating said bead multi-polymer therefrom.

2. The process of claim 1 wherein said block copolymer consists of 75% by weight butadiene and 25% by weight of styrene.

3. The process of claim 1 wherein said acrylonitrile is present in an amount of about 25% by weight and said styrene is present in an amount of 55–60% by weight.

4. The process of claim 1 wherein said elastomers comprise 10 weight percent said butadiene and 10 weight percent said butadiene-styrene block copolymer.

5. The bead multi-polymer produced according to the process of claim 1.

References Cited
UNITED STATES PATENTS

| | | | |
|---|---|---|---|
| 2,802,808 | 8/1957 | Hayes | 260—29.7 |
| 3,442,981 | 5/1969 | Stafford et al. | 260—876 |
| 3,491,166 | 1/1970 | Childers et al. | 260—876 |

SAMUEL H. BLECH, Primary Examiner

U.S. Cl. X.R.

260—23.7, 29.7, 45.95, 880